(12) United States Patent
Sosan

(10) Patent No.: US 12,726,225 B2
(45) **Date of Patent: *Sep. 1, 2026**

(54) MOBILE PHONE HOLDER WITH STORAGE COMPARTMENT

(71) Applicant: Folarin O. Sosan, Burtonsville, MD (US)

(72) Inventor: Folarin O. Sosan, Burtonsville, MD (US)

( * ) Notice: Subject to any disclaimer, the term of this patent is extended or adjusted under 35 U.S.C. 154(b) by 776 days.

This patent is subject to a terminal disclaimer.

(21) Appl. No.: 18/155,526

(22) Filed: Jan. 17, 2023

(65) Prior Publication Data

US 2023/0179250 A1 Jun. 8, 2023

Related U.S. Application Data

(63) Continuation of application No. 17/478,952, filed on Sep. 19, 2021, now Pat. No. 11,581,914.

(51) Int. Cl.
*H04B 1/3877* (2015.01)
*H04B 1/3883* (2015.01)

(52) U.S. Cl.
CPC ......... *H04B 1/3877* (2013.01); *H04B 1/3883* (2013.01)

(58) Field of Classification Search
CPC .... A01N 43/40; C07D 213/16; C07D 213/22; C07D 213/40; C07D 401/04; C07D 407/04; C07D 407/12; C07D 409/04; C07D 409/12; C07D 413/12; C07D 417/12; H04B 1/3877; H04B 1/3883
See application file for complete search history.

(56) References Cited

U.S. PATENT DOCUMENTS

| | | | | |
|---|---|---|---|---|
| 6,082,692 | A | 7/2000 | Price | |
| 7,104,516 | B2 | 9/2006 | Uto et al. | |
| 8,162,283 | B1 | 4/2012 | Royz et al. | |
| 8,727,192 | B2 | 5/2014 | Lai | |
| 10,836,326 | B1 | 11/2020 | Yang | |
| 10,865,935 | B2 * | 12/2020 | Fine | A45C 11/003 |
| 11,581,914 | B1 * | 2/2023 | Sosan | H04B 1/3877 |
| 2007/0075208 | A1 | 4/2007 | Chen | |
| 2013/0134282 | A1 * | 5/2013 | Negretti | A47B 23/04 248/176.1 |
| 2015/0282579 | A1 | 10/2015 | Piro | |
| 2021/0271291 | A1 | 9/2021 | Keene et al. | |

* cited by examiner

*Primary Examiner* — Nguyen T Vo
(74) *Attorney, Agent, or Firm* — Jacob M. Ward; Ward Law Office LLC

(57) ABSTRACT

A phone stand with a storage compartment, for supporting an object such as a cell phone is comprised of a section with a trough in the front in which to place the cell phone or mobile device, which in some embodiments has springy tabs comprising the front of the trough, a backwall of the trough that is slanted and is the front section of the storage compartment, and a storage compartment having a cavity, the storage compartment may have a top, either whole or with a cutout for access, and may be of different sizes, and the top may be fixed, or it may he hinged, or it may lift off, another embodiment forms a storage compartment with a flat surface that it is placed on, another embodiment permits side access to the storage compartment, a third embodiment with a raised trough allows cables to be routed through the storage compartment to the cell phone or mobile device.

16 Claims, 23 Drawing Sheets

36
33
22
35
36

MOBILE PHONE HOLDER WITH STORAGE COMPARTMENT

CROSS-REFERENCE TO RELATED APPLICATIONS

This application is a continuation of U.S. patent application Ser. No. 17/478,952, filed on Sep. 19, 2021. The entire disclosure of the above application is incorporated herein by reference.

FIELD OF THE INVENTION

The present application relates to a supporting stand, and more particularly to a supporting stand with a storage compartment for supporting an object such as a mobile phone or a small-size liquid crystal display (LCD).

BACKGROUND

Description of the Related Art

Due to the high growth of the computer market, cell phones, with their portability, touch-screen control functionality have become increasingly popular. In general, a user holds the cell phone during use, but when the user is tired of holding it, since the cell phone does not provide any element for support, the user has no choice but to place the cell phone on a table which limits the visibility range for the user.

This is an increasing problem as electronic devices such as mobile phones have become more powerful, users often employ them for prolonged periods of time in order to, for example, watch audio-video media (e.g., movies or television shows) or engage in video conferencing. While employing the electronic device for these prolonged periods, it is convenient to prop the device up so that the user does not have to hold the device continuously. Likewise, when engaging in video conferencing, it is useful to prop the electronic device up so that a camera included in the electronic device is held steady so that a recipient of a video transmission from the electronic device does not see a shaky image caused by handholding the electronic device.

Holders and stands for electronic devices including stationary stands and deployable stands for propping up an inserted electronic device are known in the art. However, these support structures have a disadvantage of not having storage for items that are commonly used with cell phones, such as earpieces. It is common for people to routinely misplace their earphones and earpieces. Therefore, it is desirable to provide a support stand for a cell phone that contains a storage compartment. Also, mobile phones are often damaged through falls and some of the phone holders raise the phone significantly higher than the surface on which the holder rests. If the holder tips over or if the phone falls while being inserted in or removed from the holder it could be damaged. Accordingly, it is useful to have a phone in a phone holder held as close to the base of the phone holder as possible. Also, it is desirable to have means of preventing the phone from tipping over in the phone holder.

Amazon sells a portable cell phone stand from UGreen which has features similar to other mobile phone stands on the market

- Portable and Light-Weighted: With small size of 3.74"×3.35", UGREEN cellphone stand is easy to fold and slip into your pocket A perfect companion for travel, home and office.
- Multi-Angle Adjustable: Simply adjust and choose your preferred viewing angles from 15° to 100°. UGREEN desk phone holder stand holds your smart phone or mini tablet at a comfortable angle, ideal for watching video, reading, video recording, browsing the web, playing games or facetime call.
- Widely Compatibility: This universal phone cradle stand fits for 4 to 7.9 Inch smartphone, mini tablet, e-reader with thickness up to 0.55" (including phone case). Compatible for Apple iPhone 12 11 Pro Max, iPhone 12 mini, new iPhone SE, iPhone XS XR X 8 7 6S 6 Plus 5, iPad mini, Samsung Galaxy S20 Ultra S10 S10e SHH-Note 20 9 8 S9 S8 Plus S7 Edge S6 S5 J7 J3, LG G7 GS V40 ThinQ V20 V30 G4 GS G6, Google Pixel 4 3a 3 2 XL, Nexus 5X 6P, Motorola Razr, Moto G7 G6, HTC U11 10, OnePlus 7 6T 6 5T 5.
- Sturdy and Durable: Premium ABS material supports this desktop phone holder durable in usage. Silicone pads on the bottom and cradle protect both your phone and stand from sliding and scratches.
- What You Get: 1 Pc UGREEN office phone stand adjustable.

Another product with somewhat standard features is JIUCAIE, its features include:

- Wide Compatibility—for iPhone 11 Pro XS Max XS XR X 8 Plus 8 7 Plus 7 6S Plus 6S 6 SE, Galaxy S10e S10+S10 S9+S9 S8+S8 Note 10 9 8, etc.
- Foldable and Portable—The compact and light design makes it easy to put in your backpack or pocket. A perfect companion for travel.
- Multi Viewing Angles—There are multiple viewing angles to choose from, you can always find one you like. The desktop phone cradle is ideal for watching video, recording and facetime calls.
- Make Your Life Easier—Using this desktop phone holder at home to prop up your phone, you can better view recipes while cooking. It's also great for on your nightstand, so no more fumbling around in the morning to shut off the alarm.
- Attentive Detail Design—Premium Sturdy Aluminum Metal material ensures its durability. Quality non-skid rubber covered on the front and the bottom protect your One disadvantage is that the mobile phone stands do not have storage compartments, which can be convenient for storing accessories such as earphones and electronic ear pieces. Another problem is that many phone holders do not have many if any, anti-tipping features to prevent the phone holders from tipping over if the position of the phone causes them to be unbalanced. Also, many phone holders do not include anti-tipping features to prevent the phone from falling out of the phone holder.

SUMMARY OF THE INVENTION

A stand with a storage compartment for supporting an object such as a cell phone is comprised of a section with a trough in the front to place the cell phone or mobile device, which in some embodiments has springy tabs comprising the front of the trough, a piece at the back of the trough that slants upwards and is the front section of the storage compartment, and a storage compartment with a cavity inside it for storing things, the storage compartment may have a top, either whole or with openings, maybe of different heights, and the top may be fixed or it may be hinged, or it may lift off, one embodiment places the storage compartment under the support piece behind the trough.

One improvement of this cell phone holder is its ability to hold small cell phone accessories such earpieces and charging cables. A second objective is to provide stability of the phone stand by having a long base or ground plate extending behind the slanted wall support piece that supports the phone in a reclined position. This long base wall or ground piece makes it difficult for the phone stand to topple over due to the large moment that would be required.

Another objective is to provide means for preventing the phone from falling out of the phone stand.

One embodiment forms a storage container with the flat surface of a table that it is placed on.

Another embodiment provides spacers with variable thicknesses to change the width of the space inside the trough to accommodate phone of different widths.

ADDITIONAL EMBODIMENTS INCLUDE

Where the extended ground platform or base wall of the stand is replaced with a base piece formed into a truncated pyramid;

Where one or more of the walls of the truncated pyramid are not present.

Where the height of the height of the truncated pyramid is raised, and where the trough is raised part way up the phone stand, and the floor of the trough is not contiguous with the base of the phone stand.

Where the truncated pyramid with a raised trough has one or more openings in its floor to allow electric cables to be connected to the mobile device, the cables then going through entry apertures in the trough, into the phone stand through an aperture in the front wall of the phone stand, into the phone stand, and exiting the phone stand from an exit aperture at the rear of the phone stand.

PART NUMBER DESCRIPTION

1. Phone holder. (FIG. 1)

1*a*. Truncated pyramid (FIG. 1, FIG. 2, FIG. 3)

2. Base wall of phone holder/ground platform. (FIG. 1, FIG. 2, FIG. 3, FIG. 8, FIG. 9, FIG. 10)

2*a*. Floor of trough in embodiments with raised trough (FIG. 16, 17)

3. Front wall with two partial segments. (FIG. 1, FIG. 2, FIG. 3, FIG. 8, FIG. 12,)

5. Front with one piece segment (FIG. 9, FIG. 10, FIG. 14)

6. Flexible springy members of fingers substituted for front section. (FIG. 11)

7. Back wall of trough, cell phone holder, front side of storage compartment. (FIG. 1, FIG. 2, FIG. 3, FIG. 9, FIG. 10)

9. Right side wall of storage compartment. (FIG. 1, FIG. 2, FIG. 3)

10. Left side wall of storage compartment. (FIG. 3)

11. Rear wall of storage compartment (FIG. 3)

13. Floor of storage compartment. (FIG. 1, FIG. 3, FIG. 13)

13*a*. Floor of cavity inside storage compartment in embodiments where the floor of the cavity is raised above the base wall/ground platform of the storage compartment (FIG. 16, 17)

14. Side blocks to hold cell phone in position. (FIG. 10)

15. Slotted opening in Lid (FIG. 1, FIG. 2)

16. Tubular hinge (FIG. 8, FIG. 8*a*, FIG. 8*b*, FIG. 13)

17. Lid with cutout in top for access to storage compartment. (FIG. 1)

18*a*. A top horizontal surface that is parallel to the floor. (FIG. 9, FIG. 10, FIG. 11, FIG. 12)

18*b*. Angled rear wall that extends from the top of the support piece (18*a*) down to the support floor piece (19). Also called rear support piece (FIG. 9, FIG. 10)

19. Floor piece to balance phone holder without a storage compartment. (FIG. 9, FIG. 10, FIG. 11, FIG. 12)

20. Handle of latching mechanism of lid (FIG. 5, FIG. 7, FIG. 8, FIG. 13)

20*a*. Cam that swings to lock or unlock lid. (FIG. 5, 7, 13)

20*b*. Slot in right side wall in which the cam extends out of when the lid is latched. (FIG. 6, FIG. 7, FIG. 13)

20*c*. Cylindrical shaft of latching mechanism that extends from the handle 20, through the lid with a hole, to the cam. (FIG. 5, 7)

22. Mobile phone, not part of the invention but shows the holder in use. (FIG. 2, FIG. 14, 18, 19)

23*a*. Lid with opening for shaft of latching mechanism (FIG. 4, FIG. 6, FIG. 7, FIG. 8)

23*b*. Circular hole in lid (FIG. 4, FIG. 6, FIG. 7, FIG. 8)

24. Opening between the two flexible tabs. (FIG. 11, FIG. 12, 16, 17)

25. Spacer to be placed on partial walls 3 of the front of the trough with the walls entering into the spacer through the cavity 26 within the spacer and changing the width of the interior of the trough. (FIG. 12)

26. Cavity in the spacer to provide additional flexibility for adjusting to a cell phone's width. (FIG. 12)

27. Shaft that holds the hinges (FIG. 8 FIG. 8*a*)

29. Slots in left side wall 10 for positioning hinges 16 (FIG. 8*a*)

30. Hole in center of tubular hinge for the shaft. (FIG. 8*b*)

31. Storage compartment accessed from the side (FIG. 15)

31*a*. Storage compartment formed with phone holder and table. (FIG. 21)

32. Base wall/ground plate of a storage compartment accessed from the side. (FIG. 15)

33. Channel inside of storage compartment providing access for charging cables and wires (FIGS. 16,17, 19, and 20)

33*a*. Opening of channel in front wall of phone stand (FIG. 16)

33*b*. Opening of channel in rear wall of phone stand (FIG. 17)

34. Hole inside of trough providing access to port on phone for ear pieces jack (FIG. 16, 17)

35. Ear piece—jack and wire (FIG. 18)

36. USB charging cable—jack and cable (FIG. 18, 19)

37. Table (FIG. 21)

BRIEF DESCRIPTION OF DRAWINGS

FIG. 4 shows a lid for a top loading storage compartment, with a hole that the cylindrical shaft of a latching mechanism goes through.

FIG. 6 is a partial view of the phone holder showing a slot in the side wall that the cam of the latch turns into or out of.

FIG. 14 also shows the one-piece front that can be used for all embodiments.

DETAILED DESCRIPTION

Figure 1:
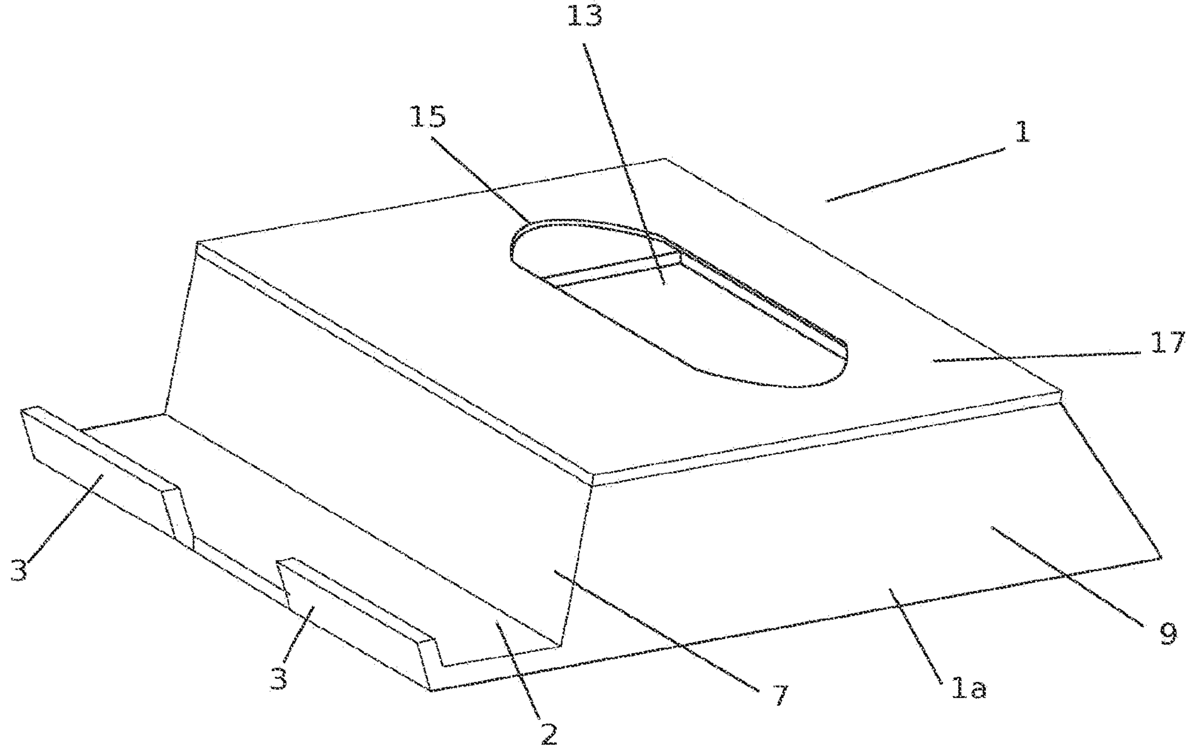
FIG. 1 shows an embodiment, for the cell phone holder with a top loading storage compartment and a slotted opening lid, which covers a storage compartment. The lid is fixed-non-removeable but in other embodiments can he removeable.

An embodiment for the holder 1 is shown in FIG. 1. FIG. 1 shows a phone holder. The trough, which is the space where the cell phone is placed, the trough being created by the inside of the front section 3, the ground platform 2 and the slanted front wall 7 of the storage compartment. The storage compartment for accessories and other items is created below the cutout lid 17 and includes the floor of the storage compartment 13, the front wall 7 of the storage compartment, the left-side wall of the storage compartment 10 (not shown in FIG. 1 but shown in FIG. 3), the right-side wall of the storage compartment 9 and the rear wall of the storage compartment 11 (not shown in FIG. 1 but shown in FIG. 3). The exterior of the storage compartment, consisting of the front wall 7, the left side wall 10, the right-side wall 9 and the rear wall 11 form a truncated pyramid 1*a* shape.

Figure 10:
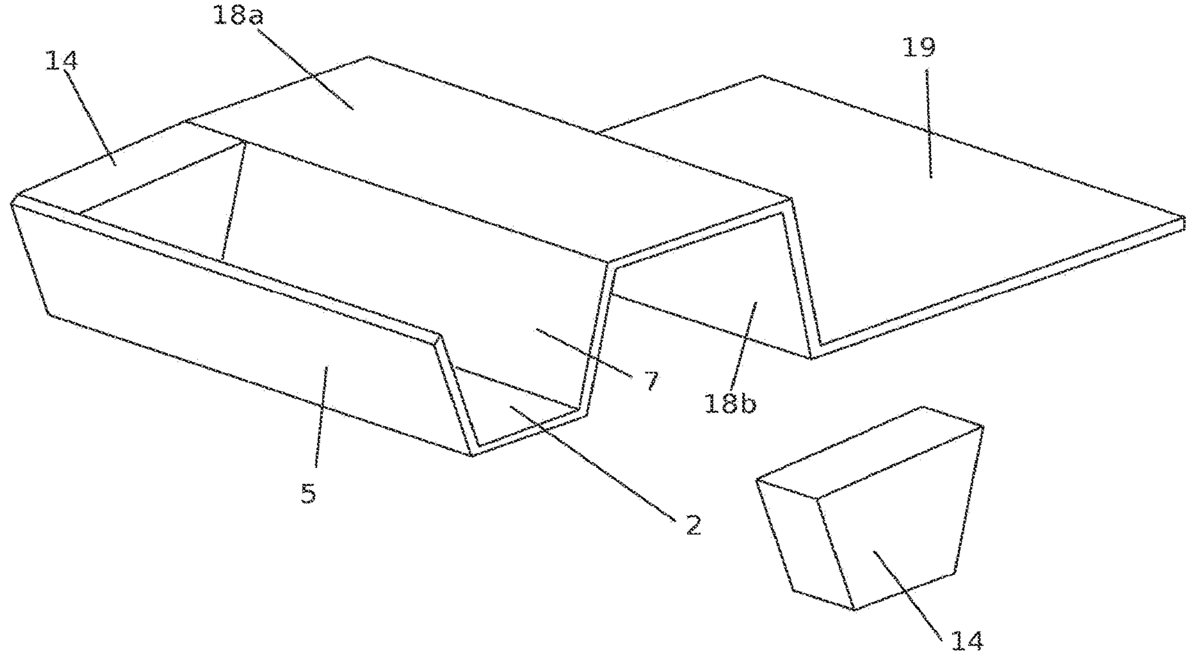
FIG. 10 shows how removable side blocks can be used to secure the cell phone in place in a basic embodiment. They can also be used in the other embodiments.
Figure 11:
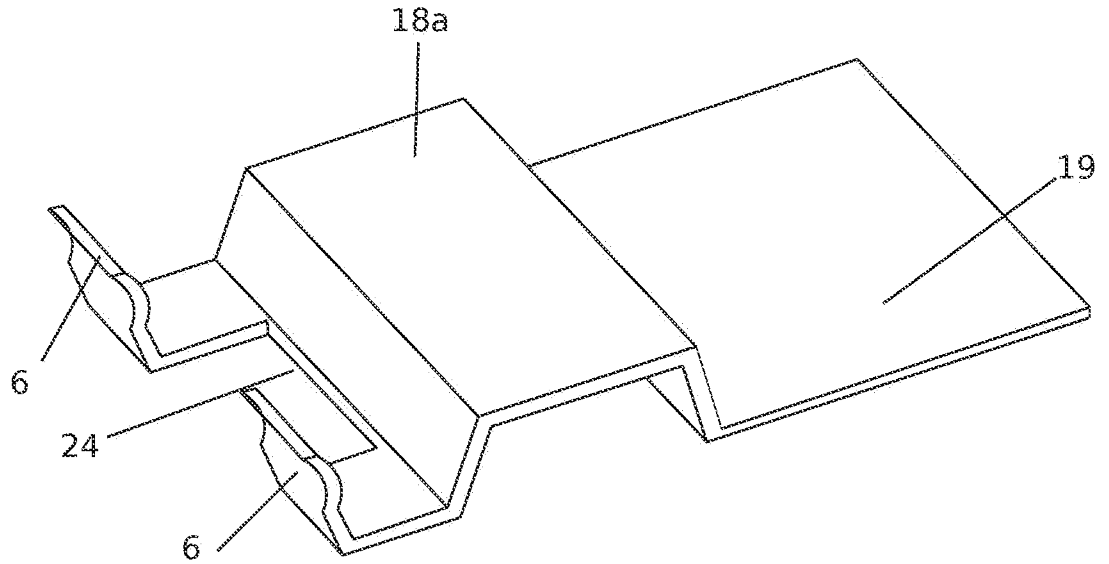
FIG. 11 shows the basic embodiment with flexible springy tabs to adjust for the cell phone's width, the flexible tabs can be used on all of the invention's embodiments.

Front members 3 of the phone stand are shown but they could also be replaced with the one-piece segment 5 from FIG. 10 or springy flexible fingers 6 of FIG. 11. Similarly, the side blocks 14 of FIG. 10 could be employed with this embodiment as well as other embodiments. The top of the truncated pyramid 1*a* is covered and has a lid 17 with a cutout slotted opening 15 as shown. The lid with a slotted opening 15 would allow easy retrieval of the earphones since a person's fingers can easily remove the earphones through the slotted opening.

Figure 2:
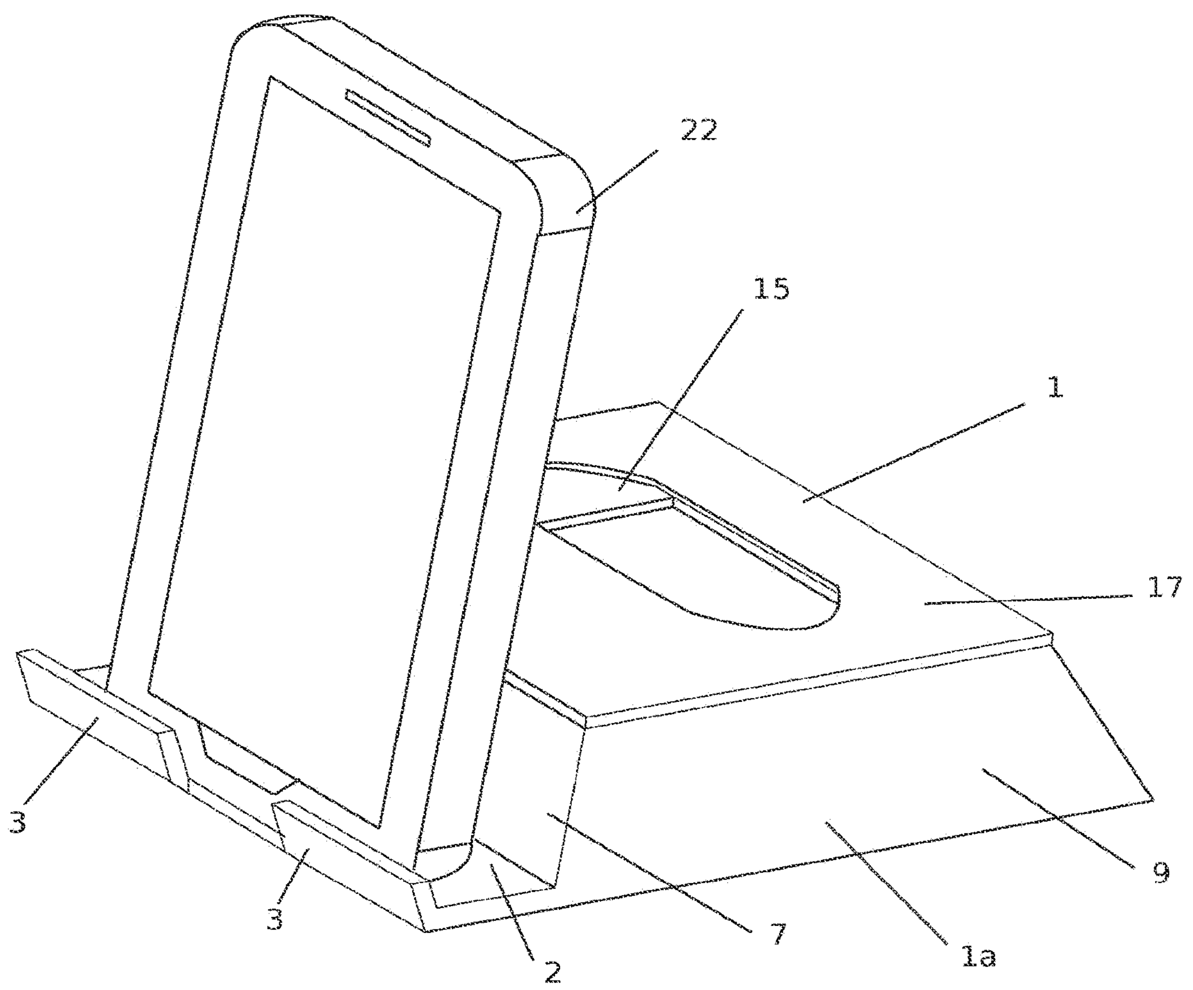
FIG. 2 shows an embodiment with a cell phone in the trough section, the cell phone is not a part of the invention but is shown to illustrate how the inventions works when in use.

FIG. 2 shows a mobile phone 22 inserted in the trough of the mobile phone holder of FIG. 1 with storage compartment below the lid 17 with a cutout 15.

Figure 3:
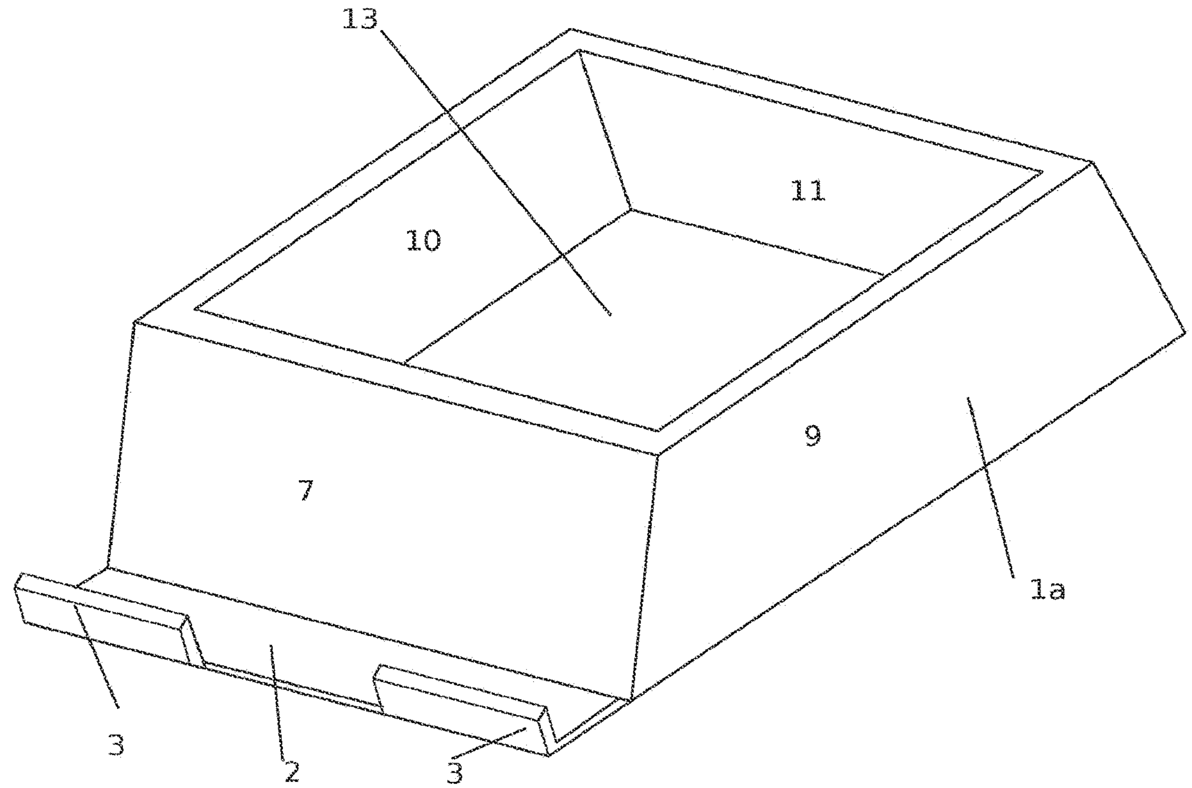
FIG. 3 shows an embodiment of the holder with a top loading storage compartment not having a lid.

FIG. 3 shows a mobile phone holder similar to that of FIG. 1 except that the top of the truncated pyramid 1*a* is not covered with a lid and the storage compartment is open. The storage compartment is created by the floor 13 and the sides 7, 9, 10, 11. Some wireless electronic earpieces such as blue-tooth earphones have storage cases. The storage compartment of the phone holder sized may be adjusted by changing the size of the front wall 7, the left side wall 10, the right-side wall 9 and the rear wall 11 to accommodate some of these storage cases allowing them to be stored inside the mobile phone stand.

Figure 4:
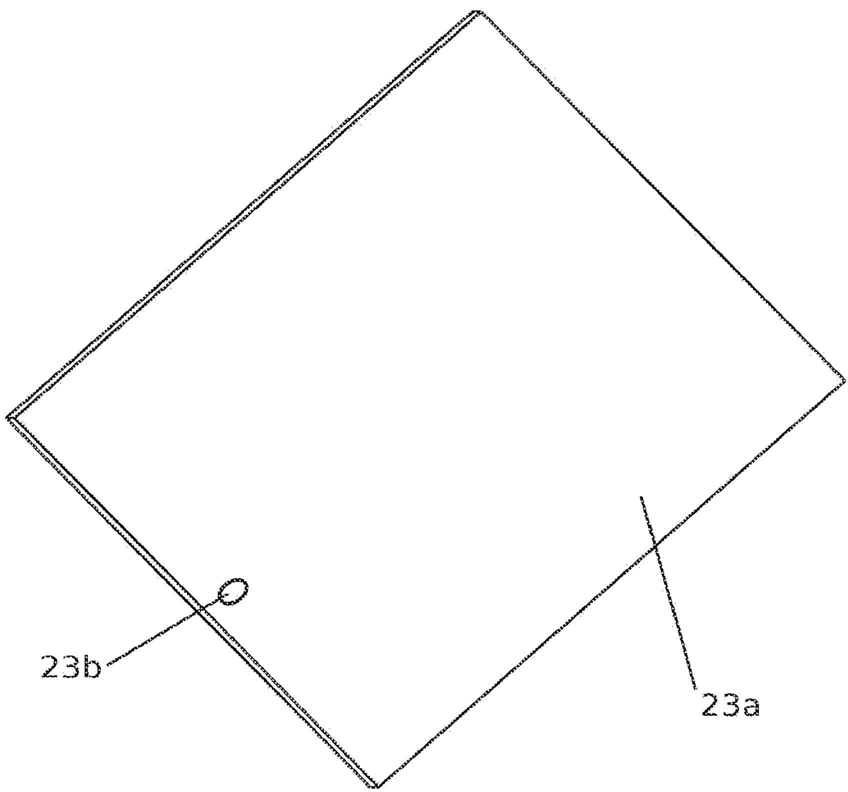

FIG. 4 shows a solid lid 23*a* with a hole 23*b* that the circular shaft 20*c* of the latching mechanism goes through.

Figure 5:
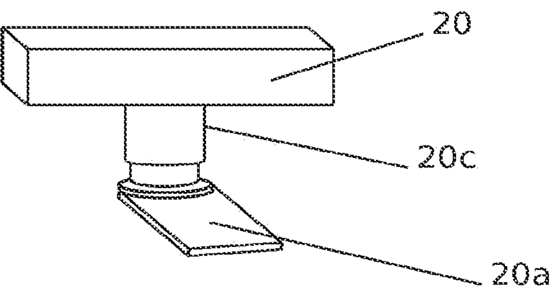
FIG. 5 shows the latching mechanism, when turned one way the cam extends through the slot in the right-side wall, when turned in the other direction the lid is free to open. The latch is preferably located on the side opposite the hinges.
Figure 6:
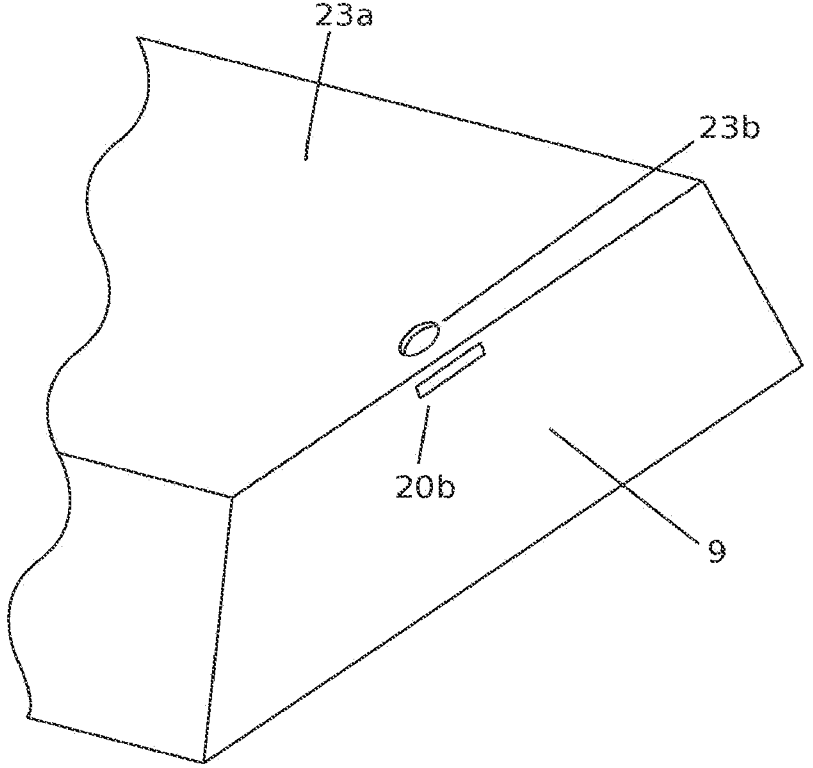
Figure 7:
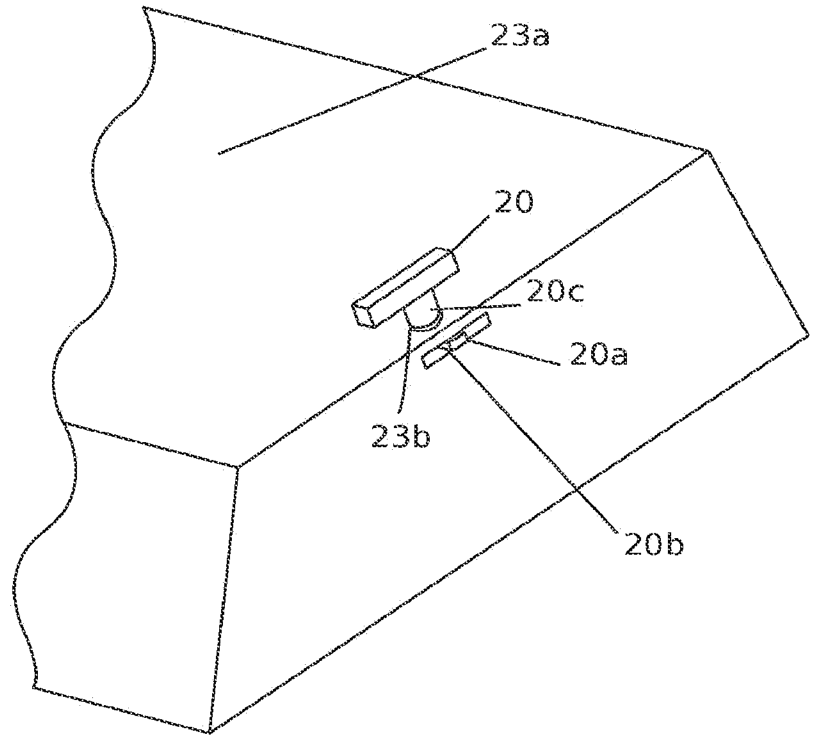
FIG. 7 is a partial view of the holder with a storage container with a locking mechanism.

FIG. 5 shows the latching mechanism, when turned one way with the handle 20 the cam 20*a*, extends through the slot 20*b* in the right-side wall 9 of FIG. 7, when turned in the other direction the lid 23*a* is free to open. The figure also shows the cylindrical shaft of the latching mechanism which goes through the hole 23*b* in the lid, also shown in FIG. 6.

FIG. 6 is a partial view of a phone holder showing the slot 20*b* on a side wall 9 of the phone carrier that the cam 20*a* turns into or out of. A hole 23*b* in the lid accommodates the shaft 20*c* of the latch.

FIG. 7 is a partial view of the mobile phone holder with a storage compartment with the locking mechanism engaged, the handle 20 is turned so that the cam 20*a* extends through the slot 20*b* in the side wall 20*b* preventing the lid from opening.

Figure 8:
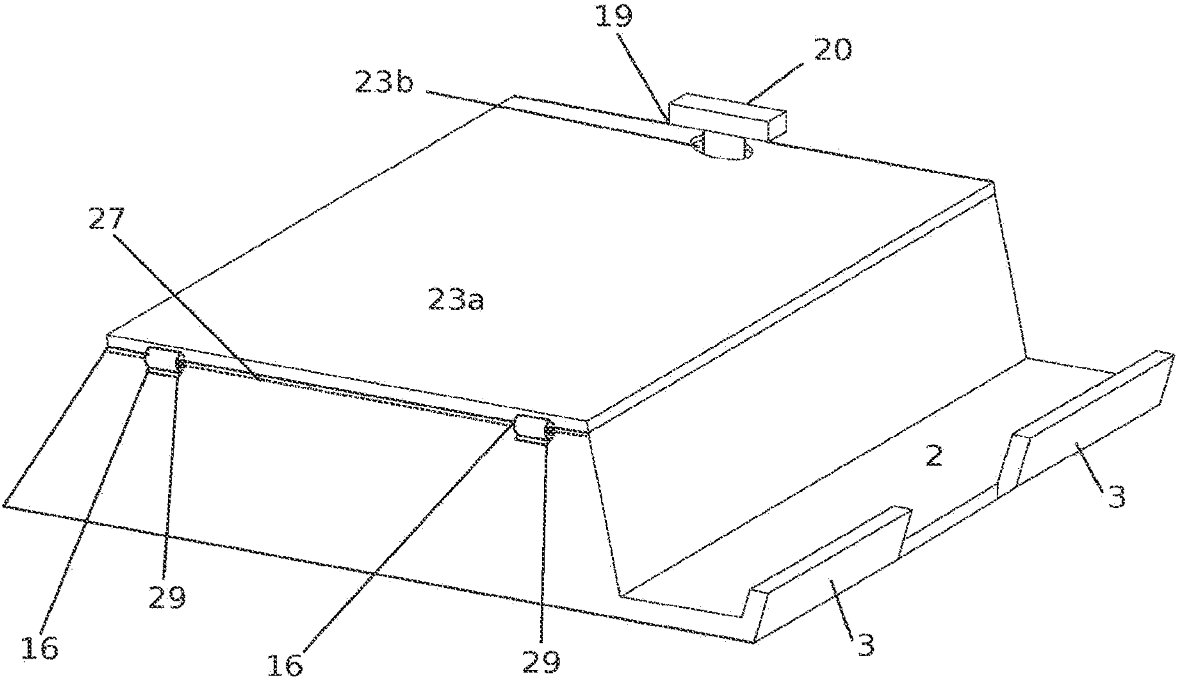
FIG. 8 Shows hinges on one side of the lid of a top loading storage compartment of so that the lid can be opened. The dotted line shows the shaft in the wall of the phone holder passing through the hinges.

FIG. 8 shows tubular hinges 16 on one side of the lid which could be a hinged lid 23*a*, with a hole 23*b* in the lid so that the lid can be opened at the top of the truncated pyramid 1*a*. FIG. 8 also shows with dotted lines how the shaft 27 goes through the wall of the left side wall 7 through holes in the hinges, so that the top 23*a* is attached to left side wall.

Figure 8A:
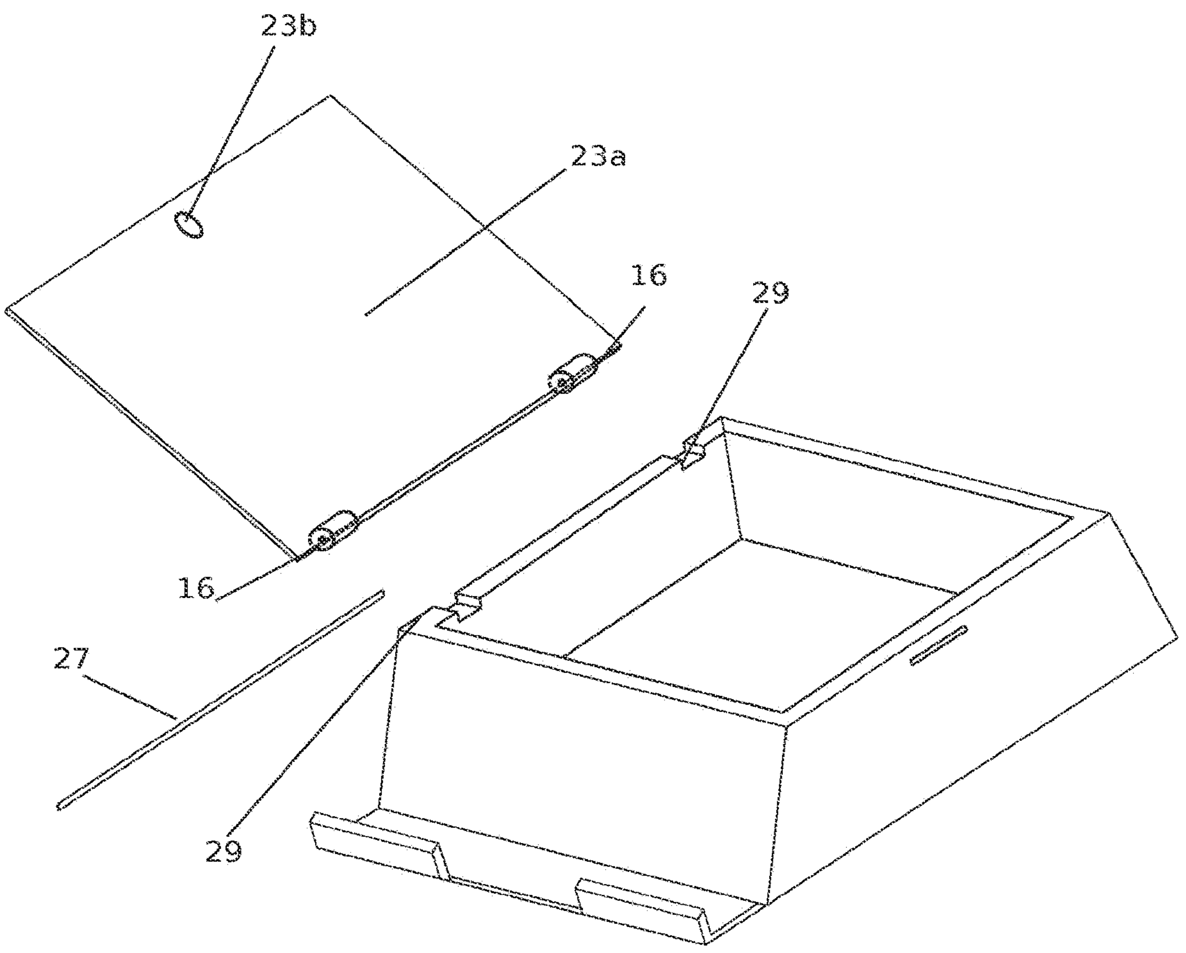
FIG. 8*a* shows the lid for a top loading storage compartment, with hinges as they are positioned to be attached through holes in the hinges with a shaft that goes in the left side wall in the body of the phone holder.

FIG. 8*a*. shows the lid with its tubular hinges 16, and shaft 27 prior to assembly. FIG. 8*a* also shows the slots 29 in the left side wall where the tubular hinges are placed.

Figure 8B:
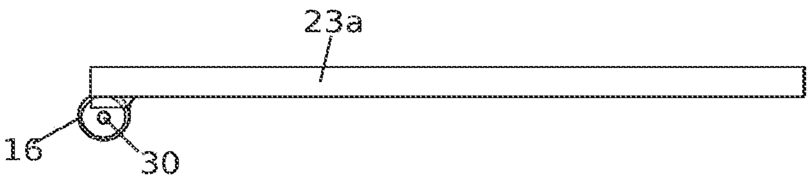
FIG. 8*b* shows how the tubular hinge is attached to the lid of a top loading storage compartment.

FIG. 8*b* shows a side view of the tubular hinges 16 as they are attached to the lid, as well as showing the hole 30 in the tubular hinge that the shaft 27 goes through.

Figure 9:
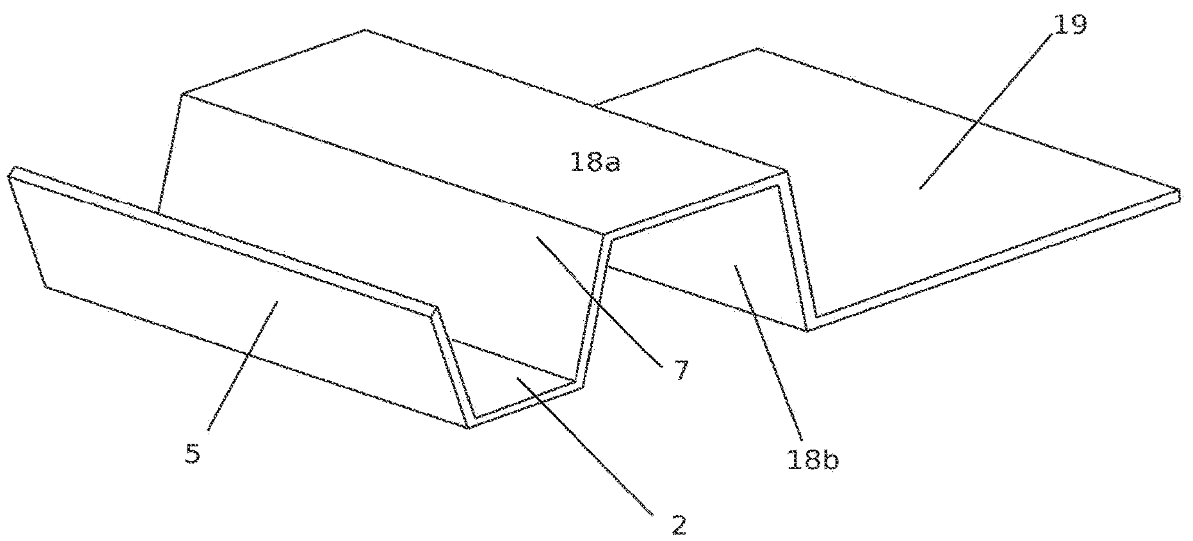
FIG. 9 shows a basic embodiment where the storage container is replaced by a support for the back of the cell phone and a floor piece to balance the phone in a holder, so it does not tip over.

FIG. 9 shows a mobile phone holder which may be made of plastic, metal, or cardboard. The mobile phone-carrier has a cross-section similar to a square-wave of one wavelength. Ground platform 2 and the floor piece 19 form the base of the phone holder and bear the weight of the mobile phone holder when the holder is placed of a flat surface. The flat top portion 18*a* is substantially horizontal. The angled wall 7 that supports the cell phone, and the rear support piece 18*b* are reclined away from the vertical approximately 50-70 degrees in opposite directions though they could be reclined to other degrees. The front wall 5, ground support 2, and the wall 7 together form a trough in which a mobile phone is placed, and its back portion rests against the wall 7. This positions the phone at a reclined angle to the user with the base of the phone sitting in the trough, the phone sits low inside the phone stand making it stable.

FIG. 10 shows a phone holder in the basic embodiment in which the front wall is a continuous section 5. Spacers 14 in it can be positioned at the ends of the trough to prevent a phone from tipping over sideways in the trough.

FIG. 11 shows a basic embodiment mobile phone stand in which the front wall comprises two flexible springy members or fingers 6 which are separated by a space 24. The flexible springy members or curved fingers 6 are designed to yield when a phone is inserted into the trough of the mobile phone holder and exert a resilient force against the phone to keep it in place inside the trough. This will help retain phones of different thicknesses including phones that may be inside cases. The space 24 between the flexible springy members 6 serves to allow a charging cable to be inserted into the phone to charge the phone when it is inside the phone holder or carrier. Many mobile phones have their charging ports located at the base of the mobile phone. One method of charging the phone in such a phone holder will be to place the phone holder on an elevated surface such as book with the front edge extending beyond the edge of the book so that the charging cable can be inserted into the phone through the space between the flexible springy members 6. Alternatively, the mobile phone may be turned upside-down inside the mobile phone holder so that the charging port is facing up instead of resting on the inside floor of the trough of the mobile phone holder. The charging cable will thus have easy access to the charging port.

Since many smart phones have an auto-rotate feature that allows the orientation of the image of their screens to be rotated horizontally or vertically, a user who wishes to have a video call with the phone-upside down can compensate for the phone's changed orientation by using the auto-rotate function of the phone to maintain the orientation of the image of the phone in its unrotated orientation.

Figure 12:
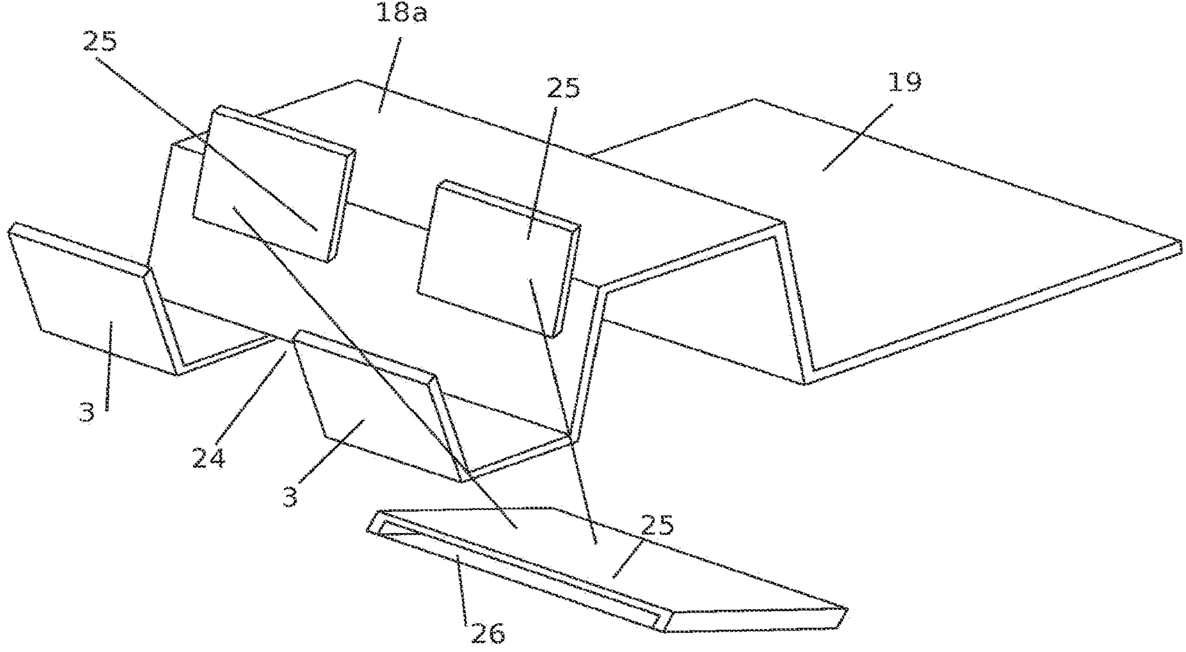
FIG. 12 shows a spacer that can be used to adjust for a cell phone's width, with a cavity inside of the spacer.

FIG. 12 shows mobile phone holder in which the front wall 3 are delineated into two straight front wall pieces 3. Spacers 25 with a slot 26 in each can be positioned on top of the front walls 3 so that the front walls 3 enter the slot 26 of the spacers 25 and are retained on the front of the phone. The spacers which can be made of plastic, foam, or other material can then serve to adapt the thickness of the trough to the thickness of the phone allowing the phone holder to accommodate phones of different widths. A method to increase the variability in the sizes of phones accommodated by the spacers is to offset the slot 26 in spacer 25 so that it is not centered in the spacer and will take up different amounts of space in the trough depending on which side of the spacer is inside the trough when the front wall sections 3 are inserted into the cavities 26 of the spacers 25. Thus, a thicker part of the spacer can be inside the trough for a thin phone, but removing the spacer, flipping it sideways and reinserting it on the wall piece 3 will cause the thinner side of the spacer 25 to be inside the trough of the mobile phone holder and accommodate a thicker phone. The phone holder can also be used without the spacers to utilize the maximum width of the trough.

Figure 13:
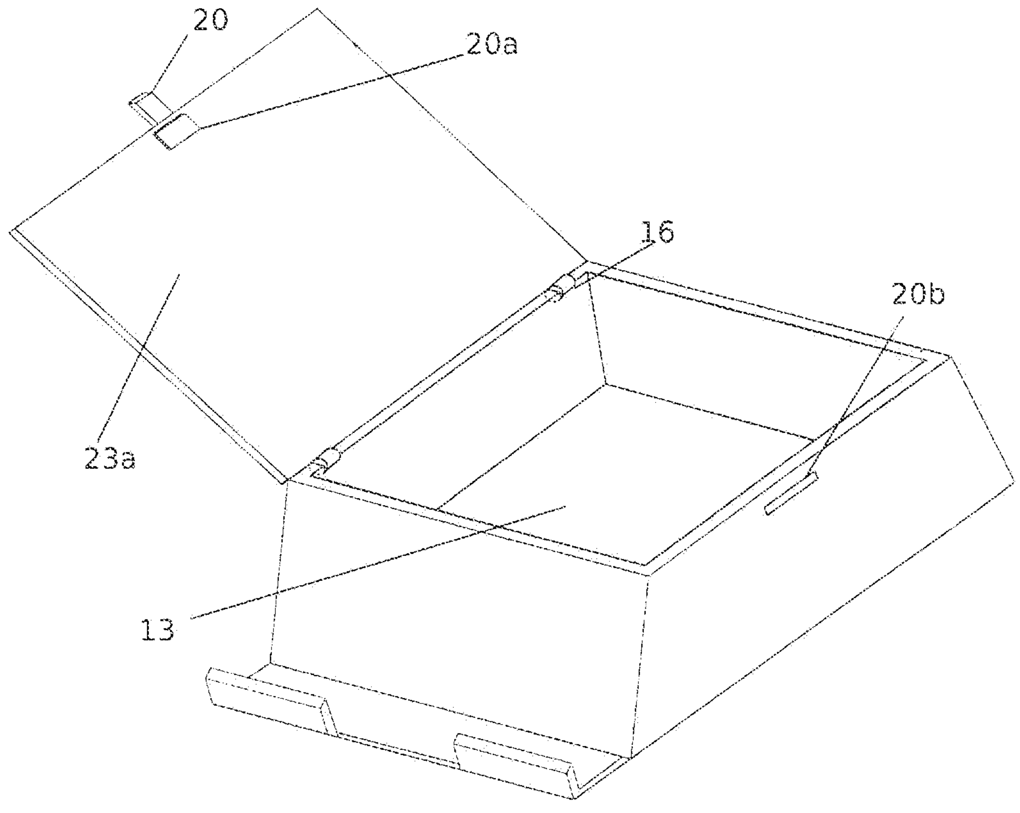
FIG. 13 shows an embodiment with a hinged lid with the lid open to a top loading storage compartment, showing how the latching cam no longer extends beyond the edge of the lid.

FIG. 13 shows the embodiment of FIG. 8 with the lid 23*a* open, showing how the cam 20*a* no longer extends beyond the edge of the lid into the sidewall of the phone holder. This is the unlocked position of the latch.

Figure 14:
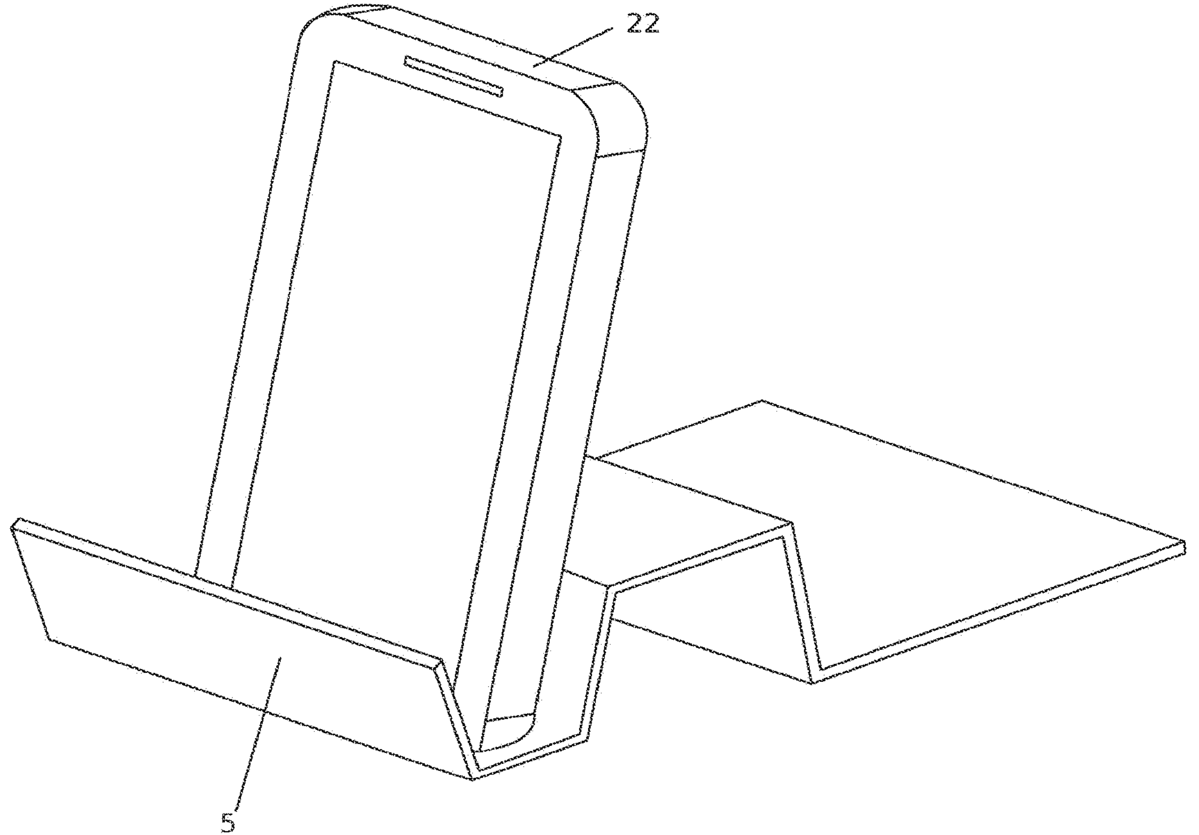
FIG. 14 shows a cell phone contained in the trough of the basic embodiment.

FIG. 14 shows a mobile phone 22 placed inside a phone holder stand. FIG. 14 also shows the one-piece front that can be used for all embodiments.

Figure 15:
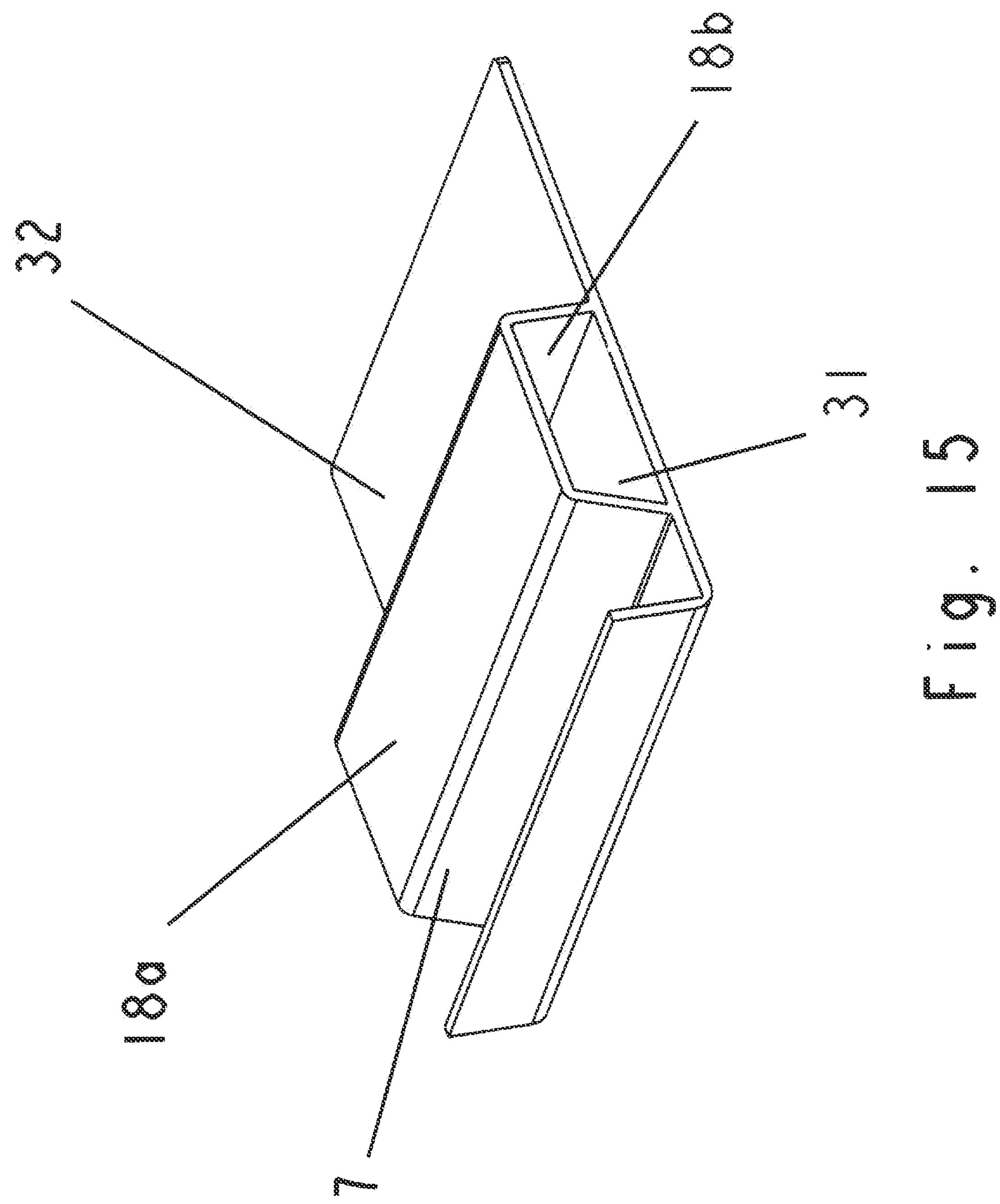
FIG. 15 shows the basic embodiment of FIG. 9 with a floor underneath the support structure for the back of the cell phone creating a storage compartment.

FIG. 15 shows the basic embodiment from FIG. 9 with a storage compartment 31 created by replacing the two separate base pieces 2 and 19 of FIG. 9 with a single base piece 32. A storage compartment 31 is thus formed which consists of front wall 7, top piece 18*a* rear piece 18*b* and a section of floor 32. The storage compartment or cubby hole is useful for storing ear pieces including their cables which may be folded and placed into this compartment. The compartment which in this embodiment has two open sides, one or both of which may be used as an entry for the phone accessories, may have one side closed off to provide access through only one side, and may have the remaining side dosed by a lid which may be hinged, or removable, to more effectively secure the contents of the compartment. Charging cables may also be stored in the compartment as well blue-tooth or other wireless phone accessories.

Figure 16:
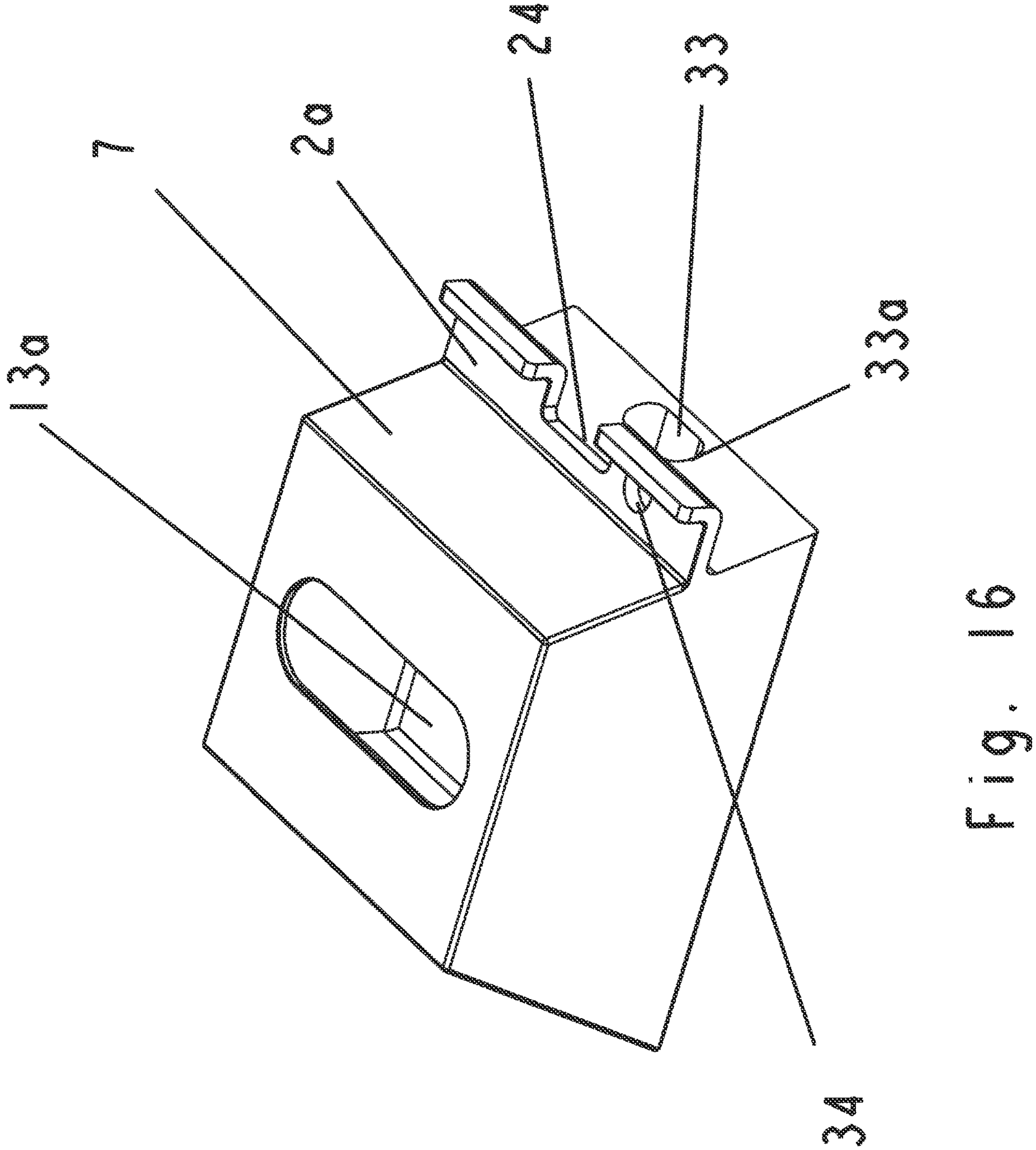
FIG. 16 shows the basic embodiment of FIG. 1 with a raised trough having a hole in the trough for an earpiece connection to a phone, and a channel below the trough through which charging cables and USB type cables can be passed through the storage compartment to the phone.

FIG. 16 shows the basic embodiment of FIG. 1 where the trough that is attached to the front wall 7 of the phone stand is raised above the base of the storage compartment to allow connections to be made to ports at the bottom of the phone. Space 24 in the front wall and floor of the trough, and hole 34 in the floor of the trough permit cables to be attached to ports in the base of a phone through the trough. A channel 33 in the front wall 7 of the storage compartment and below the trough runs from the front of the phone stand to the rear of the phone stand to permit cables to be passed through the storage compartment from the phone to power sources outside of the phone stand. In this embodiment the floor 13*a* of the cavity inside the storage compartment is above the cable channel 33 so that a wire passing through the channel is guided by the walls of the channel 33 without any obstacles such as might be presented by the corners of the storage box or its contents e.g., other cables. Providing a narrow channel running from the front to the back of the storage compartment with sufficient clearance for cables and their end pieces facilitates the insertion of such cables through the storage compartment. However, in other embodiments it may be advantageous to have the channel 33 above the floor 13*a* of the cavity inside the storage compartment if for example it is desired for a cable to be connected into something inside the cavity inside the storage compartment. Also, while the channel 33 is shown running from the front to the back of the storage compartment with its entrance hole 33*a* in the front and exit hole at the back of the storage compartment, alternatively the entry and exit holes may be on other sides e.g., in adjacent sides of the storage compartment. It will also be possible to attach cables or other accessories to the ports of a phone in the trough of the phone stand without passing through the channel 33, or the trough. The phone may be turned upside-down or sideways for example. The cavity inside the storage compartment is the place where items are stored inside the storage compartment.

Figure 17:
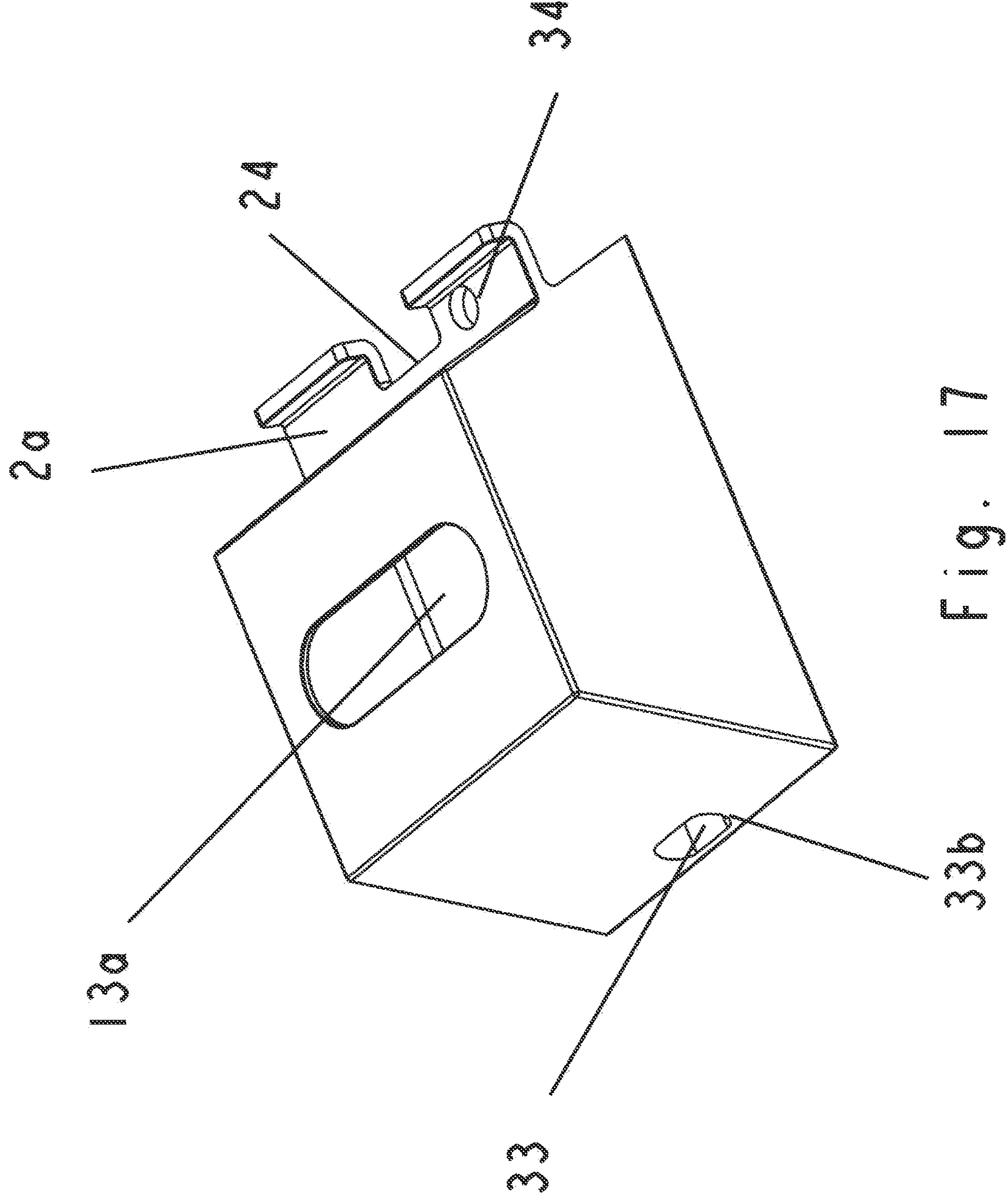
FIG. 17 shows the basic embodiment of FIG. 1 with a raised trough and rear exit of the channel that passes through the storage compartment.

FIG. 17 shows the basic embodiment described in FIG. 16 with the rear showing. The exit aperture 33*b* of channel 33 is shown in the rear of the storage compartment. Hole 34 for a connection to a phone is shown in the floor 2*a* of the raised trough.

Figure 18:
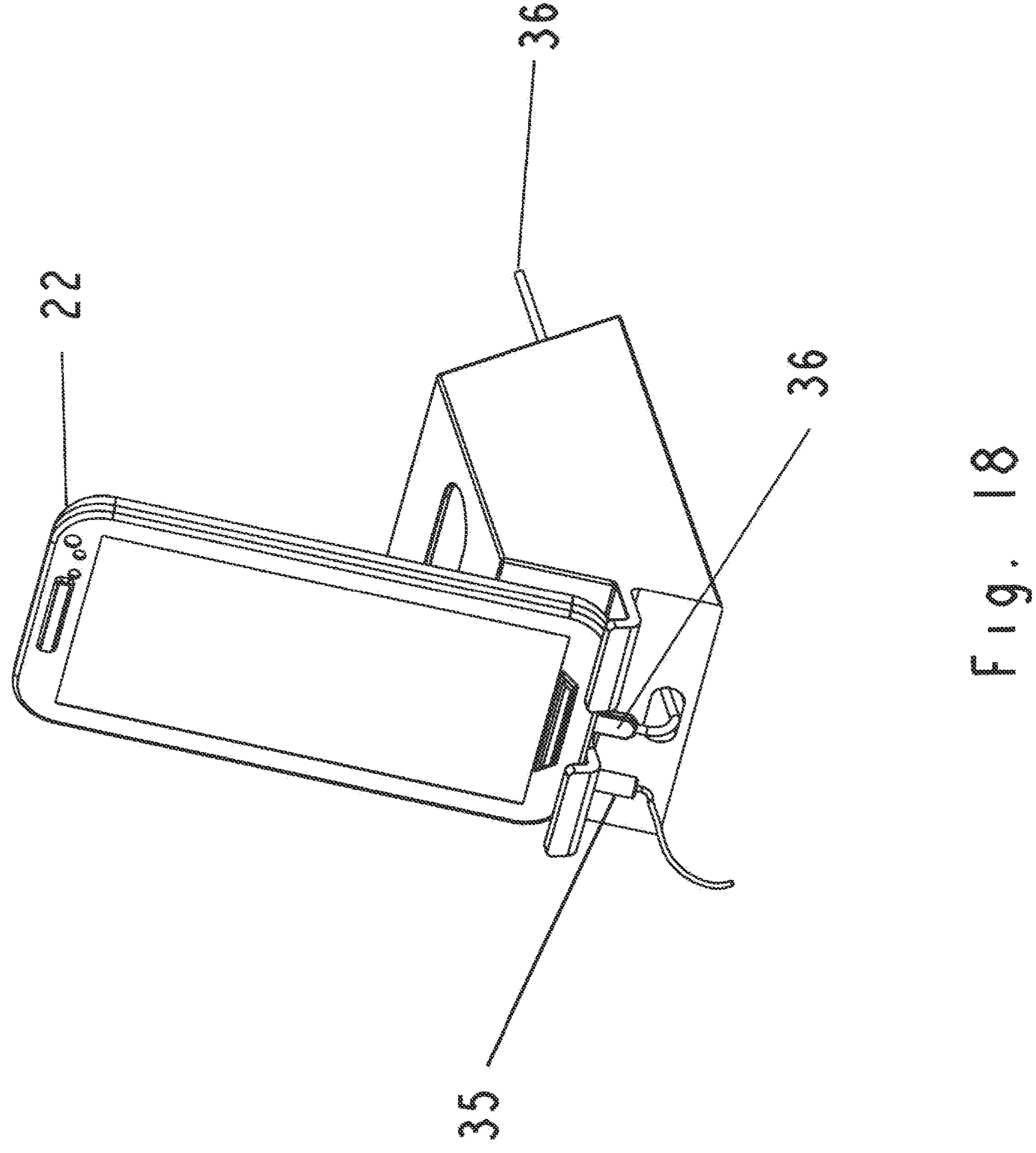
FIG. 18 shows a phone in the basic embodiment of FIG. 1 with a raised trough. A power charging cable that passes through the channel in the storage compartment connects to the phone through an opening in the trough. An ear piece connects to the phone jack through an opening in the tough.

FIG. 18 shows a phone 22 with its base in the trough of the phone stand. Charging cable 36 is shown connected to the phone at one end and passing through the opening of the channel in the front wall of the storage compartment to the back of the storage compartment where it exits the storage compartment and would get connected to an electrical power source. Wired ear piece 35 is shown connected to the phone through an aperture in the trough.

Figure 19:
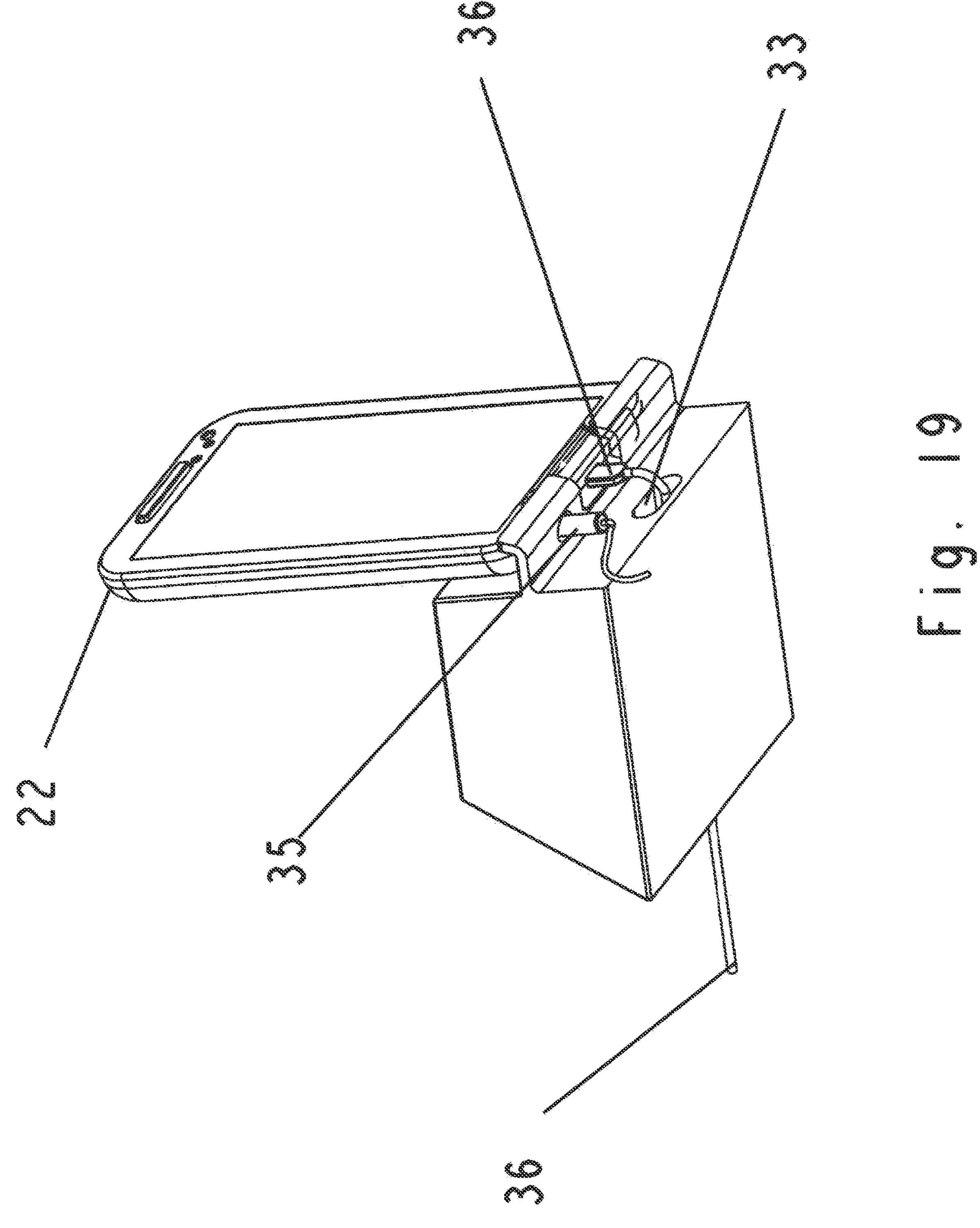
FIG. 19 shows the embodiment of FIG. 18 as seen from the beneath the phone stand.

FIG. 19. Shows embodiment described in FIG. 18 with mobile phone 22 carried by the phone stand, charging cable 36 and earpiece 35 connected to the phone. A portion of charging cable 36 is shown emerging from the rear of the storage compartment through channel 33 running through the storage compartment.

Figure 20:
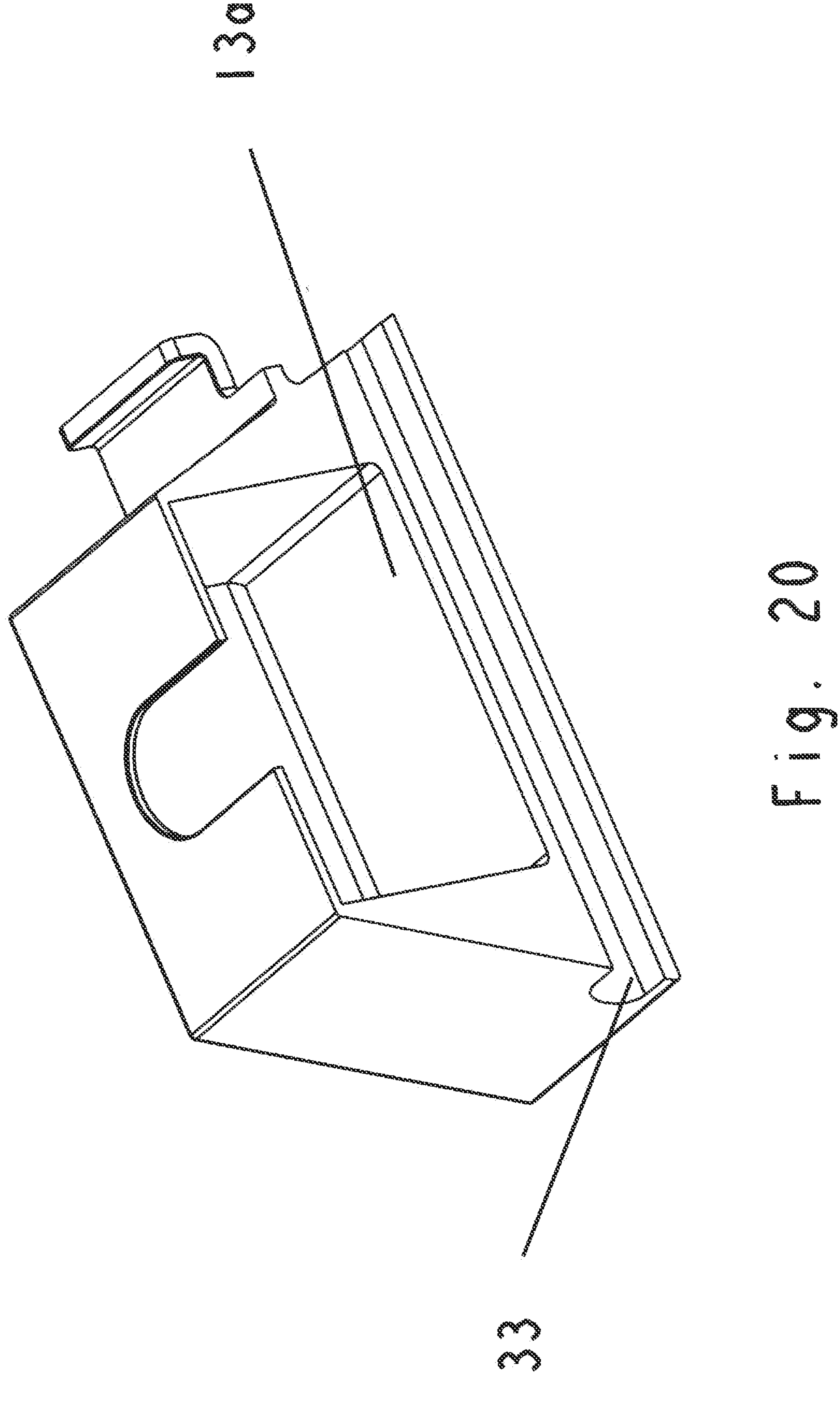
FIG. 20 is a section view through the middle of the phone stand of embodiments 16-19 showing the floor of the cavity inside the storage compartment raised above the base of the phone stand and a channel for cables passing from the back wall of the storage compartment, under the storage compartment and out through the front wall of the phone stand.

FIG. 20. This figure is a section view through the middle of the embodiment described in FIGS. 16-19. The raised floor 13*a* of the cavity inside the storage compartment is shown with cable channel 33 passing beneath it.

Figure 21:
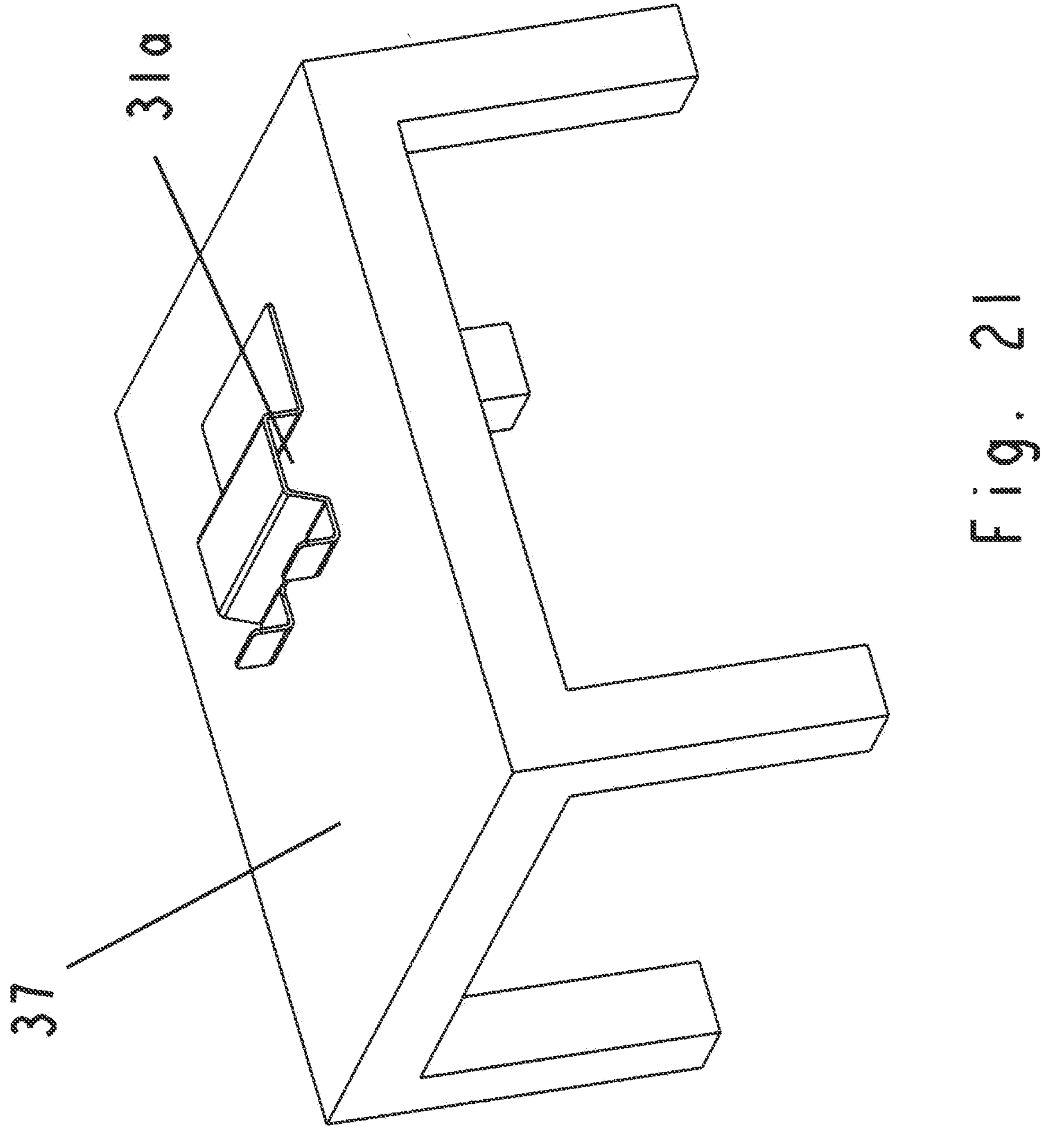
FIG. 21 shows a phone stand of the types described in embodiments of FIGS. 9, 10, 11, 12, and 14, resting on a table. The flat surface of the table forming the floor of a storage compartment comprising the top and front and back walls of a truncated pyramid formed from the extended base wall or ground plate of the phone stand.

FIG. 21. Shows a basic embodiment with a gap in the ground plate or base wall of the phone stand (FIGS. 9, 10, 11, 12, 14), resting on a table 37. The flat top of the table 37 forms a closure of the base of the phone so that a storage compartment 31*a* is formed with the sides of the truncated pyramid of the phone stand. Two side walls and base wall of the truncated pyramid comprising the storage compartment of this embodiment are missing. The top of table 37 completes a storage compartment with two open sides and top wall. This type of phone stand is suited for situations where the phone stand will often be placed on a table for extended periods e.g., a work desk without being removed. A cable for earphones or ear pieces can be coiled up, or folded up, and stored in the storage compartment formed by the walls of the truncated pyramid and the surface of the desk.

Accordingly, several objects and advantages of my invention are—

A holder stand for mobile electronic devices comprising:
- a trough to hold the mobile electronic device;
- a ground platform that extends from the base of the trough to the bottom of a storage compartment acting as the floor to the storage compartment;
- springy flexible tabs positioned at the front of the trough, in front of the mobile electronic device to adjust for various size devices;
- a slanted backside wall rising up from the ground platform that faces toward the mobile device, which also acts as the front support wall for a top loading storage compartment;
- a right-side support wall for the top loading storage compartment, when looking at the holder from the front of the display;
- a left side support wall for the top loading storage compartment;
- a rear support wall for the top loading storage compartment;
- the top loading storage compartment comprising a four-sided truncated pyramid, with the front support wall, right support wall, left support wall, and rear support wall comprising the four walls;
- a cavity within the storage compartment for storing items, where the floor of the storage compartment is the floor of the cavity;
- a lid for the storage compartment with a cutout for providing access to the cavity.

A holder stand where the extended ground platform is replaced with a floor constructed in the truncated pyramid.

A holder stand where one or more of the sides of the truncated pyramid are not present.

A holder stand as described above where the spring flexible tabs are replaced by a front section with two partial walls.

A holder stand with a front section with two partial walls with removable off-centered spacers to change the width of the trough.

A holder stand with two partial walls where removable slide blocks pieces are positioned on ends of ground platform to hold mobile devices in position.

A holder stand where the front of the trough comprises a one-piece front section.

A holder stand for mobile electronic devices comprising:
- a trough to hold the mobile electronic device;
- a ground platform that extends from the base of the trough to the bottom of a storage compartment acting as the floor to the storage compartment;
- Two or more partial walls form the front wall of the trough and removable off-centered spacers are placed over the partial walls to adjust for various size devices;
- a slanted backside wall rising up from the ground platform that faces toward the mobile device, which also acts as the front support wall for a top loading storage compartment;
- a right-side support wall for the top loading storage compartment, when looking at the holder from the front of the display;
- a left side support wall for the top loading storage compartment;
- a rear support wall for the top loading storage compartment;
- the top loading storage compartment comprising a four-sided truncated pyramid, with the front support wall, right support wall, left support wall, and rear support wall comprising the four walls;
- a cavity within the storage compartment for storing items, where the floor of the storage compartment is the floor of the cavity;
- a lid for the storage compartment with a cutout for providing access to the cavity;
- where the Holder stand might not have a lid or—
- it might use of removable lid without a cutout on the storage compartment.
- Or the it may the use a hinge lid on top of the storage compartment or—
- It might the use a hinged lid with a locking mechanism on storage compartment or—
- A holder stand with the storage lid with a cutout with the lid being removable.—or
- a holder stand with the front wall of the trough consisting of two or more partial wall sections where the storage compartment is replaced by a parallel to the surface support piece the same height as the slanted front support wall for the back of the cell phone, and with a rear support wall slanting down to the surface support piece or—
- Ae holder stand as described above where a floor is added to the support piece to create a side loading storage compartment or A holder stand as described above where a floor is attached to the support piece and extends away from the back of the mobile electronic device.

A holder stand for mobile electronic devices comprising:

a trough to hold the mobile electronic device;

a ground platform that extends from the base of the trough to the bottom of a storage compartment acting as the floor to the storage compartment;

two partial wall sections form the front wall of the trough;

a slanted backside wall rising up from the ground platform that faces toward the mobile device, which also acts as the front support wall for a top loading storage compartment;

a right-side support wall for the top loading storage colnpartmem, when looking at the holder from the front of the display;

a left side support wall for the top loading storage compartment;

a rear support wall for the top loading storage compartment;

the top loading storage compartment comprising a four-sided truncated pyramid, with the front support wall, right support wall, left support wall, and rear support wall comprising the four walls;

a cavity within the storage compartment for storing items, where the floor of the storage compartment is the floor of the cavity:

a lid for the storage compartment with a cutout for providing access to the cavity;

removable side block positioned on ends of the trough to hold mobile electronic devices in place.

A holder stand for mobile electronic devices comprising:

a trough to hold the mobile electronic device;

a ground platform that extends from the base of the trough to the bottom of a storage compartment acting as the floor to the storage compartment;

two partial wall sections comprise the front wall of the trough;

a slanted backside wall rising up from the ground platform that faces toward the mobile device, which also acts as the front support wall for a top loading storage compartment;

a right-side support wall for the top loading storage compartment, when looking at the holder from the front of the display;

a left side support wall for the top loading storage compartment:

a rear support wall for the top loading storage compartment;

the top loading storage compartment comprising a four-sided truncated pyramid, with the front support wall, right support wall, left support wall, and rear support wall comprising the four walls;

a cavity within the storage compartment for storing items, where the floor of the storage compartment is the floor of the cavity;

a lid for the storage compartment with a cutout for providing access to the cavity;

1. and the trough raised, the ground platform no longer extending from the base of the trough to the floor of the storage compartment, whereby there is a part of the front wall of the storage compartment extending below the trough, and where the floor of the cavity in the storage compartment is raised above the ground platform of the storage compartment.

The holder stand as described above, with a channel that runs from the back of the storage compartment to the front of the storage compartment with the channel having apertures on both the front and back wall of the top loading storage compartment and The holder stand has openings in the trough above the aperture opening for the channel on the front wall, whereby cables for the phone maybe routed from the back wall of the storage compartment to the front wall, and then through the opening in the trough to connect to the mobile electronic device.

A holder stand as described above where the channel is below the floor of the cavity and above the ground support of the storage compartment a holder stand with the front wall of the trough consisting of two or more partial wall sections where the storage compartment is replaced by a parallel to the surface support piece the same height as the slanted front support wall for the back of the cell phone, and with a rear support wall slanting down to the surface support piece and— the holder stand is placed on a flat surface so that it rests with the support piece flat on the surface, which then forms a storage compartment with side access with the walls of the phone stand.

What is claimed is:

1. A holder stand for a mobile electronic device comprising:

a truncated pyramid, the truncated pyramid including, a back wall having a lower end and an upper end, a rear wall having a lower end and an upper end, a top horizontal surface extending from the upper end of the back wall to the upper end of the rear wall, a floor extending from the lower end of the back wall to the lower end of the rear wall, the floor spaced apart from the top horizontal surface, a left side wall joined to the back wall, the rear wall, the top horizontal surface, and the floor, a right side wall joined to the back wall, the rear wall, the top horizontal surface, and the floor, wherein the each one of the back wall, rear wall, left side wall, and right side wall are angled upwardly from the floor to the top horizontal surface to define the truncated pyramid structure, and wherein the back wall, the rear wall, the top horizontal surface, the floor, the left side wall, and the right side wall define a compartment within the truncated pyramid, the compartment accessible by an opening in the top horizontal surface and including a lid to selectively cover the opening in the top horizontal surface;

a base wall extending from the back wall of the truncated pyramid; and a front segment extending from the base wall, wherein the back wall, the base wall, and the front segment form a trough to selectively hold the mobile electronic device.

2. The holder stand of claim 1, wherein the front segment further comprises a first segment spaced apart from a second segment.

3. The holder stand of claim 1, wherein an opening is provided into the trough.

4. The holder stand of claim 1, wherein the front segment is a flexible springy member to facilitate retaining the mobile device in the trough.

5. The holder stand of claim 1, further comprising a side block selectively disposed in the trough to facilitate retaining the mobile device in the trough.

6. The holder stand of claim 1, further comprising a spacer selectively disposed in the trough to facilitate retaining the mobile device in the trough.

7. The holder stand of claim 1, wherein the lid includes a slotted opening, the slotted opening providing access to the compartment.

8. The holder stand of claim 1, wherein the lid is pivotally attached to the holder stand.

9. The holder stand of claim 1, wherein the lid includes a locking mechanism and at least one of the left side wall and the right side wall includes a slot, wherein the locking mechanism and the slot cooperate to selectively secure the lid in a position substantially covering the opening in the top horizontal surface.

10. The holder stand of claim 1, wherein the lid includes a hole.

11. The holder stand of claim 1, wherein the lid includes a handle.

12. The holder stand of claim 1, wherein the base wall is spaced apart from the lower end of the back wall to position the base wall above the lower end of the back wall.

13. The holder stand of claim 12, wherein the floor includes an inside channel extending between the back wall and the rear wall.

14. The holder stand of claim 13, wherein the base wall includes a hole.

15. A holder stand for a mobile electronic device comprising:

a truncated pyramid, the truncated pyramid including, a back wall having a lower end, an upper end, and an opening adjacent the lower end, a rear wall having a lower end, an upper end, a rear opening adjacent the lower end, a top horizontal surface extending from the upper end of the back wall to the upper end of the rear wall, a floor extending from the lower end of the back wall to the lower end of the rear wall, the floor spaced apart from the top horizontal surface, a left side wall joined to the back wall, the rear wall, the top horizontal surface, and the floor, a right side wall joined to the back wall, the rear wall, the top horizontal surface, and the floor, wherein the each one of the back wall, rear wall, left side wall, and right side wall are angled upwardly from the floor to the top horizontal surface to define the truncated pyramid structure, and wherein the back wall, the rear wall, the top horizontal surface, the floor, the left side wall, and the right side wall define a compartment within the truncated pyramid, the compartment accessible by an opening in the top horizontal surface and including a lid to selectively cover the opening in the top horizontal surface;

a base wall extending from the back wall of the truncated pyramid, the base wall spaced apart from the lower end of the back wall to position the base wall above the lower end of the back wall; and a front segment extending from the base wall, the base wall including a hole, wherein the back wall, the base wall, and the front segment form a trough to selectively hold the mobile electronic device.

16. A holder stand for a mobile electronic device comprising:

a back wall having a lower end and an upper end;

a top horizontal surface extending from the upper end of the back wall;

a rear wall extending from the top horizontal surface, wherein the back wall, the top horizontal surface, and the rear wall form a generally truncated pyramid shape;

a floor extending from the back wall to the rear wall and spaced apart from the top horizontal surface, wherein the floor, the back wall, the rear wall, and the top horizontal surface form a storage compartment within the truncated pyramid, the storage compartment having at least one open side providing access to the storage compartment and including a lid to selectively cover the opening in the top horizontal surface;

a base wall extending from the back wall; and a front segment extending from the base wall, wherein the back wall, the base wall, and the front segment form a trough to selectively hold the mobile electronic device.

* * * * *